US006526736B1

(12) United States Patent
Anstey

(10) Patent No.: US 6,526,736 B1
(45) Date of Patent: Mar. 4, 2003

(54) ROTARY CONVEYOR TINE STRIPPER WITH ANTI-WRAP RELIEF AND/OR NOTCHING

(75) Inventor: Henry Dennis Anstey, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/025,944

(22) Filed: Dec. 26, 2001

(51) Int. Cl.[7] .................. A01D 75/00; A01D 43/02; A01D 89/00
(52) U.S. Cl. ............................. 56/341; 56/364
(58) Field of Search ................... 56/364, 341, 16.1; 209/616

(56) References Cited

U.S. PATENT DOCUMENTS 4,854,454 A * 8/1989 Dahlby ........................ 209/616

6,314,708 B1 * 11/2001 Engel ............................ 56/341

* cited by examiner

*Primary Examiner*—Thomas B. Will
*Assistant Examiner*—Alicia Torres

(57) ABSTRACT

An overshot rotary conveyor includes a plurality of sets of flat tines welded to a cylindrical shaft at respective locations spaced across the shaft, each tine including a curved leading edge. Located on the opposite sides of each flat tine and having forward ends received about the cylindrical shaft is a stripper including upper and lower halves. The lower half is shaped to provide a clearance zone below flat planar sides of the upper half, and to provide a stripper edge at each side which is at the front of the clearance zone and acts to push crop carried over by the adjacent tine into the clearance zone where the crop drops away. Located ahead of the stripper edges at the opposite sides of the lower stripper half in the vicinity of the cylindrical shaft is a notch having the purpose engaging, and deflecting away from the conveyor shaft, any crop that may be carried past the stripper edge by the conveyor tine.

10 Claims, 3 Drawing Sheets

ROTARY CONVEYOR TINE STRIPPER WITH ANTI-WRAP RELIEF AND/OR NOTCHING

FIELD OF THE INVENTION

The present invention relates to a rotary conveyor used on a large round baler for conveying crop from the pick-up to the baling chamber, and more particularly relates to a stripper for the rigid tines of the conveyor.

BACKGROUND OF THE INVENTION

Rotary conveyors of the type with which the present invention is particularly adapted for use include a plurality of plate-like teeth or tines mounted to a rotor shaft in axially spaced, diametrically opposite pairs. Located between adjacent pairs of the teeth is a stationary, curved stripper or lifter, with adjacent strippers sandwiching a given pair of teeth and acting to strip or lift crop material from the curved leading edge or surface of the tines.

The current state of the art stripper is disclosed in U.S. patent application Ser. No. 09/594,250, filed on Jun. 15, 2000, now U.S. Pat. No. 6,31,708 and assigned to the same assignee as is the present application. This stripper works well in most crop conditions, but when crop is limp or sticky, it can fold around or hairpin on the leading edges of the teeth and/or stick to it. If this happens, the crop build-up may act between adjacent strippers causing them to spread, which may eventually result in crop entering between the strippers and wrapping around the rotary conveyor shaft to which the teeth are secured. This wrapping is some times severe enough that various problems result including increased resistance to rotation and extra loads on components, such as the drive shafts, teeth and strippers themselves. Early component failure has been observed.

SUMMARY OF THE INVENTION

According to the present invention there is provided an improvement to the stripper design disclosed in the above-identified United States patent application.

An object of the invention is to provide a stripper that is configured for overcoming the above-noted deficiencies of the prior art stripper.

A more specific object of the invention is to provide a stripper configured for shearing and/or providing a relief area for crop that has become folded about the leading edges of the tines or teeth of the rotary conveyor.

Still a more specific object of the invention is to provide a stripper having one or the other, or both, of a relatively large relief area, and a notch located in the vicinity of the tine rotor shaft, with the relief area permitting crop pieces carried over by the adjacent tine to exit from the vicinity of the shaft and the notch working to scrape and dump crop located at the weld area between the adjacent tine and shaft.

These and other objects will become apparent from a reading of the ensuing description together with the appended drawings.

DETAILED DESCRIPTION OF THE PREFERRED EMBODIMENT

Figure 1:
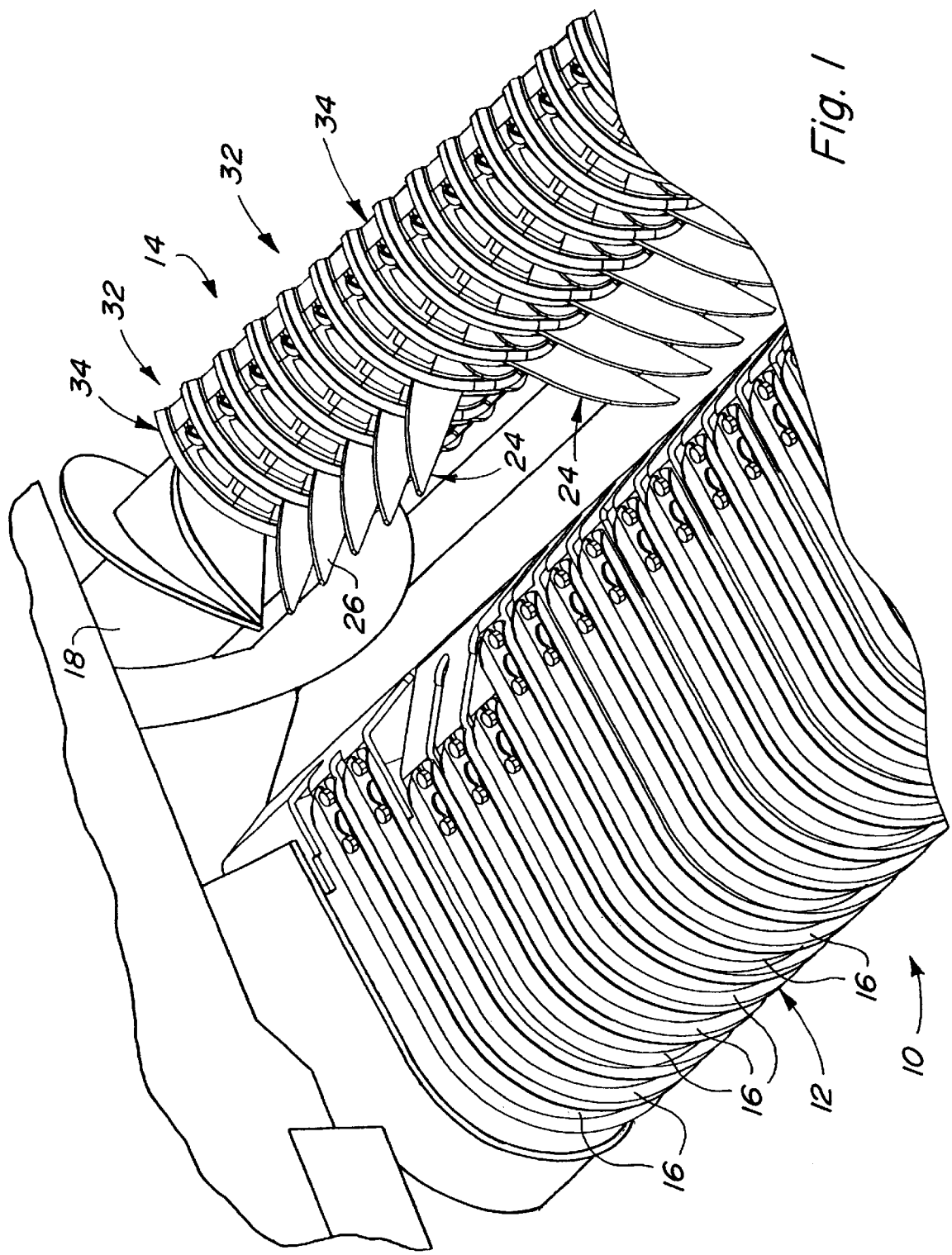
FIG. 1 is a left front perspective view, from above, of a right end portion of a crop material collector showing a wide pick-up together with a rotary conveyor equipped with strippers constructed according to the present invention.

Referring now to FIG. 1, there is shown a crop collector 10, which, for example, is used as part of a baler for making large cylindrical bales. The crop collector 10 includes a pick-up 12 of a conventional structure including a plurality of spring tooth tines (not shown) arranged in side-by-side, angularly spaced groupings which are rotated about a transverse axis so as to lift a windrow of crop material from the ground and deliver it to a rotary conveyor 14, which, in turn, conveys the crop to an inlet of a baling chamber. A plurality of transversely spaced, U-shaped strippers 16 are arranged so as to have the individual tine groupings pass between them, with horizontal sections of the strippers acting to strip crop from the tines.

Figure 2:
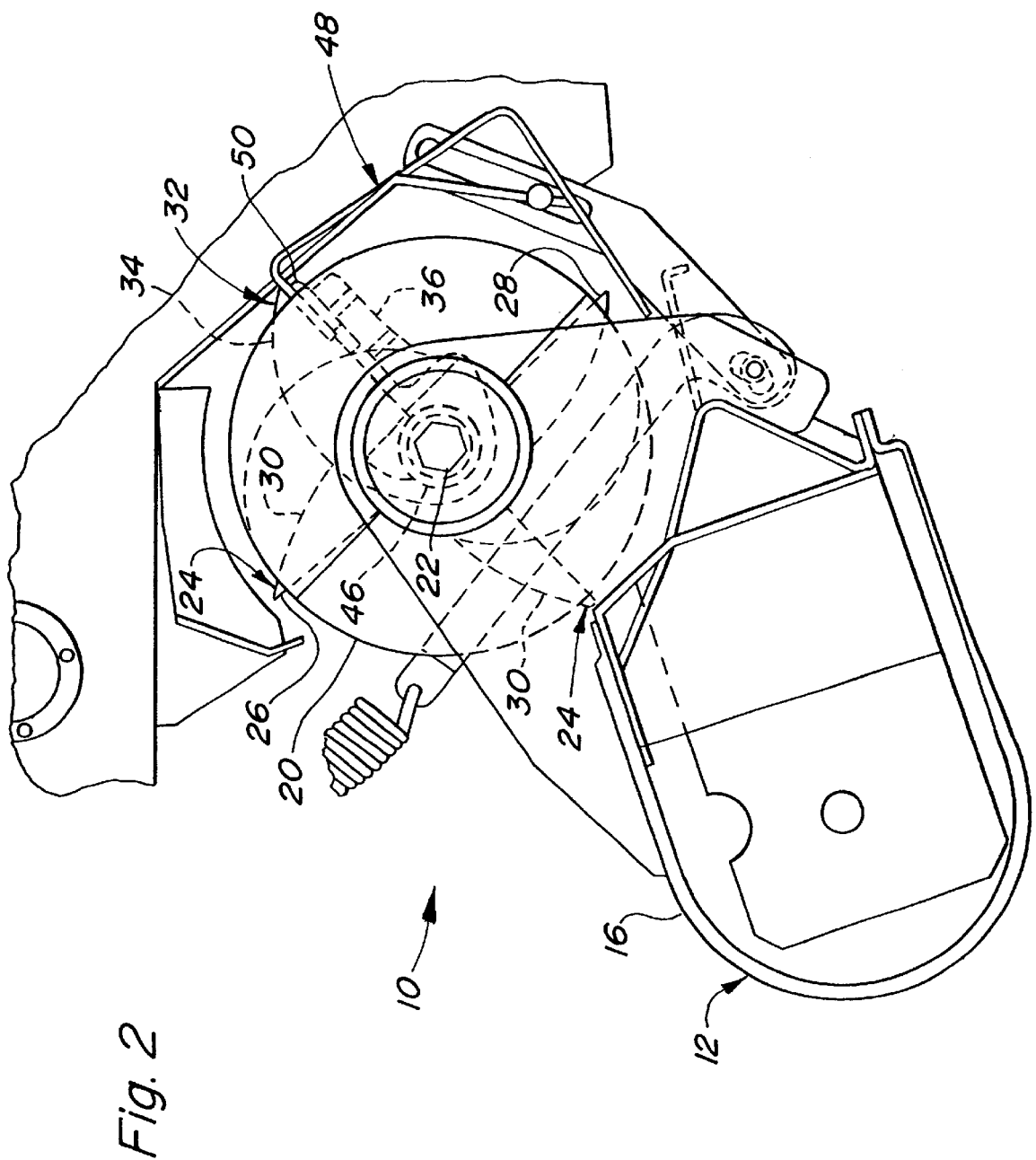
FIG. 2 is a left side elevational view of the crop material collector shown in FIG. 1.

The rotary conveyor 14 is provided with right- and left-hand crop centering augers 18 (FIG. 1) and 20 (FIG. 2), respectively, that are fixed to a hexagonal through shaft 22 for overshot rotation and function to narrow the stream of crop, for example, to the width of the baling chamber. Referring now also to FIG. 2, it can be seen that a plurality of transversely spaced, rigid tine structures 24 are mounted on the shaft 22 between the augers 18 and 20. Each of the tine structures 24 is in the form of a flat plate configured to define a pair of diametrically opposite tines 26 and 28 having arcuate leading edges 30. A plurality of tine strippers 32 are mounted in side-by-side spaced relationship so as to define respective slots for the passage of the tines 26 and 28 of the respective tine structures 24 during rotation of the shaft 22.

Figure 3:
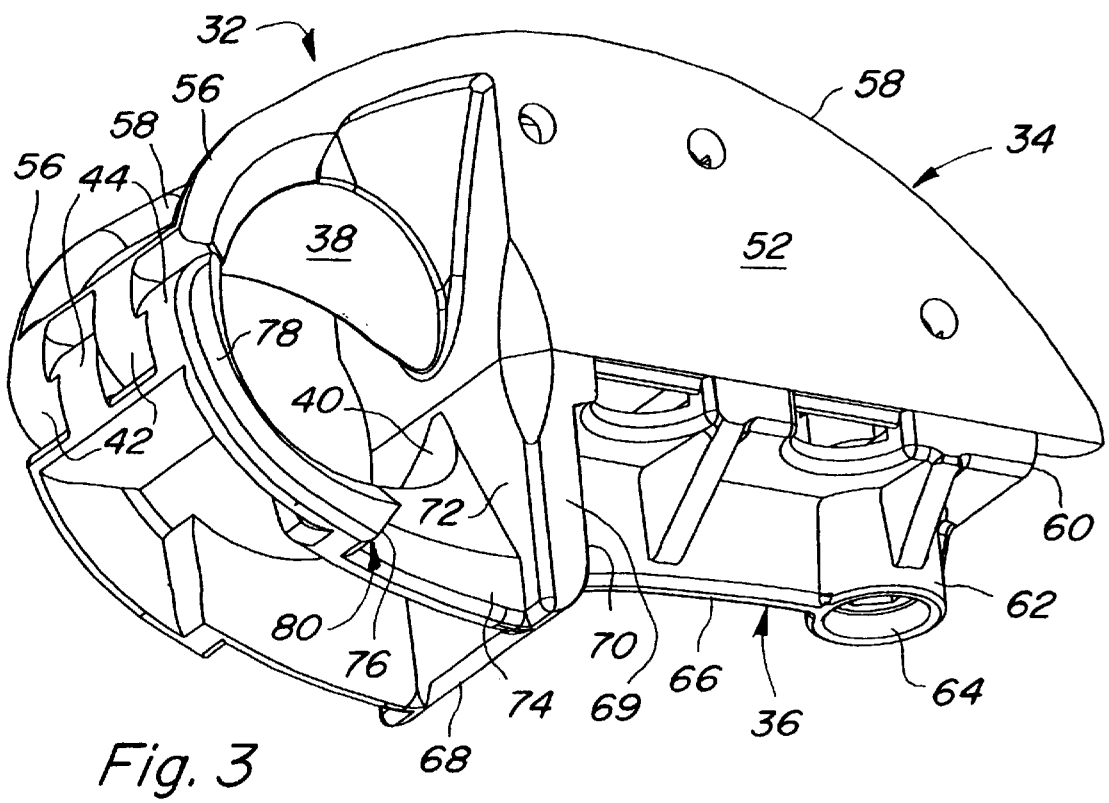
FIG. 3 is a left side perspective view, from below, of one of the strippers, shown in FIG. 1.

The strippers 32 are each constructed of upper and lower halves 34 and 36, preferably by molding them from ultra high molecular weight (UMHW) polyethylene, which material has a high wear tolerance. Referring now also to FIG. 3, it can be seen that respective semi-cylindrical cavities 38 and 40 are respectively molded into the forward ends of the stripper halves 34 and 36, and with forward ends of the halves 34 and 36 being provided with respective pairs of lugs or tabs 42 and 44, which are interlocked with each other to define a hinge joint between the stripper halves. As can best be seen in FIG. 2, the halves 34 are mounted together with the cylindrical cavities at their forward ends surrounding a tubular, cylindrical tooth mounting shaft 46 to which the blade structures are welded, the shaft 46 being coupled, as by conventional plates, not shown, for rotation with the drive shaft 22. A stripper support 48 extends transversely behind the rotary conveyor 14 and has an upper end which terminates in a plurality of transversely spaced tabs including downwardly and forwardly inclined mounting portions 50 which are located approximately midway between the two and three o'clock positions about the tooth mounting tube or shaft 46. Each tab mounting portion 50 is located in a slot defined in the rear of a respective one of the strippers 32 by the upper and lower halves 34 and 36, and is provided with a hole in which is received a mounting bolt (not visible) that extends through bores provided in each of the halves, a nut being received on a threaded end of the bolt for clamping the stripper halves 34 and 36 together and to the tab mounting portion 50.

Referring now to FIG. 3, it can be seen that the upper half 34 of each stripper 32 is provided with a pair of transversely spaced planar sides 52 that extend perpendicular to the axis of the shaft 46 and terminate in arcuate rims having a minor front section 56 defined at a radius about the center of the semi-cylindrical cavity 38 and joined to a major rear section 58 formed at a fixed radius about an axis located below the upper half and to the rear of the semi-cylindrical cavity 38. The strippers 32 are so oriented relative to the tine structures 24 that, as a given tine structure 24 sweeps past the major rim sections 58 of adjacent strippers 32, an approximate right angle is continuously formed between the rim sections and the curved leading edge 30 of each of the tines 26 and 28 of the given rotary conveyor tine structure 24. This orientation of the tine edges 30 to the stripper rim sections 58 results in the conveyed crop being lifted off the tines 26 and 28.

The lower stripper half 36 is constructed in quite a different fashion than is the upper stripper half 34 so as to prevent crop stems that are hair pinned about, and/or stuck to, the leading edge 30 of the tines 26 and 28 from being carried to a position where they become wrapped about the shaft 46. Specifically, the lower stripper half 36 does not have spaced side walls like the side walls 52 of the upper stripper half 30, but rather has a flat base 60 having the same width as, and having a planar surface engaging the underside of, the upper stripper half 34. Joined to a central rear part of the base 60 is a cylindrical boss 62 having a mounting hole 64 extending thorough it that is aligned with the mounting hole in the upper stripper half 34 for receiving the bolt for mounting the stripper 32 to the mounting tab portion 50. A central, fore-and-aft extending rib 66, that is joined to the base 60, is joined to the boss 62 and a transverse wall 68 at the front of the base 60. The transverse wall 68 has opposite planar side surfaces 69 and parallel front and rear surfaces that extend perpendicular to the base 60. The rear surface of the transverse wall defines opposite stripper portions which face crop-receiving clearance areas at the opposite sides of the rib 66 and which cooperate with the side surfaces 69 to define respective, relatively sharp stripper edges 70 that extend perpendicular to the base 60. The front surface of the wall 68 is a forwardly facing step surface 72. The stripper edges 70 serve to shear and/or strip crop carried by the tines 26 and 28 beyond the rims 58 of adjacent strippers 32 so as to keep the crop away from the tine mounting shaft 46. Beginning at an outer end portion of each step surface 72, relative to the base 60, and curved inwardly towards the semi-cylindrical cavity 40, is a first outwardly facing surface section 74 having a forward end terminating at an inner edge or base of a rearwardly facing, axially extending intermediate surface 76 having an outer end joined to a second outwardly facing surface section 78 that is curved at a radius about the axis of the semi-cylindrical cavity 40. Thus, the first and intermediate surfaces 74 and 76, respectively, cooperate to define a notch 80, which operates to scrape off and dump any crop pieces, which find their way to the welded area of the tine structures 24 and are carried past the notches 80 by the rotating tine mounting shaft 46, so that the crop pieces are prevented from wrapping tightly about the tine mounting shaft 46. It is to be understood that the notches 80 could each just as well be defined by a first surface which is inclined inwardly to the intermediate surface 76 from the adjacent outer end surface 69 of the transverse wall 68.

Figure 4:
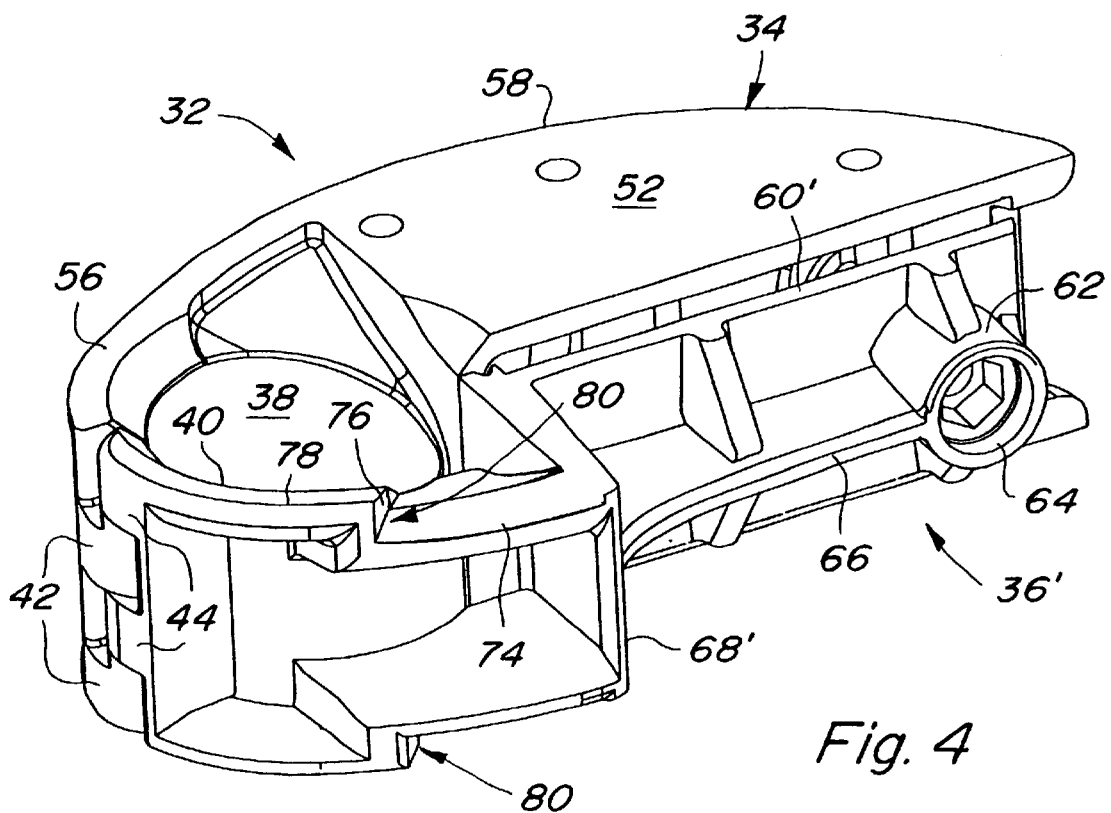
FIG. 4 is a left top perspective view showing an alternate embodiment of one of the strippers having a narrowed rear end section providing additional relief for permitting crop to drop.

Referring now to FIG. 4, there is shown a second embodiment of the lower stripper half, here designated by the reference numeral 36', and which differs from the lower stripper half 36, only in that it has a base 60' which is narrower than the base 60, and which no longer have edges which perform a stripping action like the stripper surfaces 70 since the narrowing of the base is carried forward through the transverse wall 68, resulting in the rear edges of the ends of the wall 68' being too far away from the paths of rotation of the flat conveyor tines. Because the base 60' is narrower than the base 60 of the previously described stripper half 36, the clearance zone beneath the opposite sides 52 of the upper stripper half 34 is enlarged by the difference between the widths of the bases 60 and 60'. The remaining structure is the same as that of the lower stripper half 36 and is given the same reference numerals.

During operation of the rotary conveyor 14, crop conditions may be such that pieces of crop material, especially if damp, thin stemmed and sticky, become bent around or hair pinned on the leading edges 30 of the tines 26 and 28. These crop pieces are carried past the rims 58 of the sides 52 of adjacent ones of the strippers 32. Once the tines 26 and 28 rotate below the upper stripper halves 34, and the bases 60 of the lower stripper halves 36, they enter the large clearance zone defined between the opposite sides of the base 60 and the rib 66 of each stripper half 36, into which the crop pieces, that are closest to the shaft 46, fall as they are engaged and pushed off the tines 26 and 28 by the stripper surfaces 70. If any of these crop pieces are carried beyond the stripper edges 70 and begin to rotate with the tine mounting shaft 46, they are scraped from the shaft 46 and dumped by the action of the notches 80. Thus, it will be appreciated that the lower stripper halves 36 cooperate to keep crop pieces either from finding their way to the bases of the tines 26 and 28, where they could become wrapped about the tine mounting shaft 46, and/or by scraping them from the shaft 46 before they become tightly wound thereon. Testing has shown that, depending on the crop conditions, a lower stripper half constructed to include either only the notches 80, or only the large clearance area below the walls 52 of the upper stripper half 34, are effective to keep crop material from wrapping about the shaft 46. Further, in some crop conditions, it has been found that the lower stripper half embodiment shown in FIG. 4, where the clearance zone is enlarged, is required to provide adequate clearance for permitting crop pieces to move away from the shaft 46.

Having described the preferred embodiment, it will become apparent that various modifications can be made without departing from the scope of the invention as defined in the accompanying claims.

What is claimed is:

1. In a crop stripper adapted for being mounted between, and stripping crop material from, transversely spaced rigid flat tines of a rotary conveyor having a forward direction of rotation, including first and second halves coupled together and meeting at a plane, with each half defining a semi-cylindrical cavity so as to form a cylindrical opening adapted for receiving a cylindrical tine mounting shaft and, with said first half defining a semi-oval shape when viewed from the side, said first half including a pair of parallel planar side walls spaced transversely from each other by a predetermined distance so as to just fit between adjacent flat tines of the rotary conveyor, said side walls extending perpendicular to said plane and including marginal portions defining arcuate rims, the improvement comprising: said second stripper half having opposite side surfaces extending away from said plane and including at least a major portion spaced apart by a distance less than said predetermined distance, whereby first and second clearance zones are respectively defined at opposite sides of said lower stripper half into which crop material carried past the planar surfaces of said first stripper half by an adjacent tine may be deposited.

2. The crop stripper, as defined in claim 1, wherein said second half of said stripper includes opposite side portions respectively defined by a pair of stripper surfaces extending generally perpendicular to said plane and respectively located downstream from said first and second clearance zones relative to a forward direction of rotation of the rotary conveyor with which the stripper is adapted for use, whereby the stripper surfaces act to force crop material from an adjacent tine into an associated one of said clearance zones.

3. The crop stripper, as defined in claim 2, wherein said pair of stripper surfaces are located adjacent said cylindrical opening.

4. The crop stripper, as defined in claim 3, wherein said second half of said stripper is provided with first and second notches at its opposite sides at respective locations downstream from said pair stripper surfaces, with said notches each having an axially extending surface facing in a direction opposite the forward direction of rotation of the tine mounting shaft, whereby crop material carried past said stripper surfaces by the tine mounting shaft will be caught and kept from wrapping tightly about the tine mounting shaft.

5. The crop stripper, as defined in claim 3, wherein said second half of said stripper is provided with first and second notches respectively located at opposite ends of said semi-cylindrical cavity of said second stripper half; and said first and second notches each having a generally axially extending surface facing in an upstream direction, whereby crop material carried past said stripper surfaces by said adjacent tine will be caught by said notches and kept from wrapping about the tine mounting shaft located in said cylindrical opening.

6. The crop stripper, as defined in claim 2, wherein said stripper surfaces each have a relatively sharp stripper edge for shearing crop material carried past it by an adjacent tine.

7. The crop stripper defined in claim 1 wherein said second stripper half includes a rectangular base having opposite sides which are respectively flush with the opposite sides of said upper stripper half; and said opposite side surfaces of said second stripper half being joined to said base.

8. The crop stripper defined in claim 7 wherein said rectangular base joins a transverse wall at a location adjacent said semi-cylindrical cavity; and said transverse wall having opposite ends respectively defining first and second stripper surfaces facing toward a respective one of said clearance zones.

9. In a crop stripper, adapted for being mounted between and stripping crop material from transversely spaced rigid flat tines of a rotary conveyor having a forward direction of rotation, including first and second halves coupled together and meeting at a plane, with each half defining a semi-cylindrical cavity so as to form a cylindrical opening adapted for receiving a cylindrical tine mounting shaft and, with said first half defining a semi-oval shape when viewed from the side, said first half including a pair of parallel planar side walls spaced transversely from each other by a predetermined distance so as to just fit between adjacent flat tines of the rotary conveyor, said side walls extending perpendicular to said plane and including marginal portions defining arcuate rims, the improvement comprising: said second stripper half having first and second notches formed at opposite ends of said semi-cylindrical cavity, with the notches each being defined by an axial first surface facing in a direction opposite to said forward direction of rotation and having a base joined to an outwardly facing second surface which slopes axially inwardly to said base from a location spaced therefrom in said direction opposite to said forward direction of rotation, whereby said notches will catch crop material carried past them by the rotating tine mounting shaft so as to prevent crop material from becoming tightly wrapped about the shaft.

10. The crop stripper, as defined in claim 9, wherein said second stripper half further includes a stripper structure, having a forwardly facing stripper surface, located, with respect to the first surface of the adjacent notch, at a remote end of the second surface from the first surface.

* * * * *